UNITED STATES PATENT OFFICE.

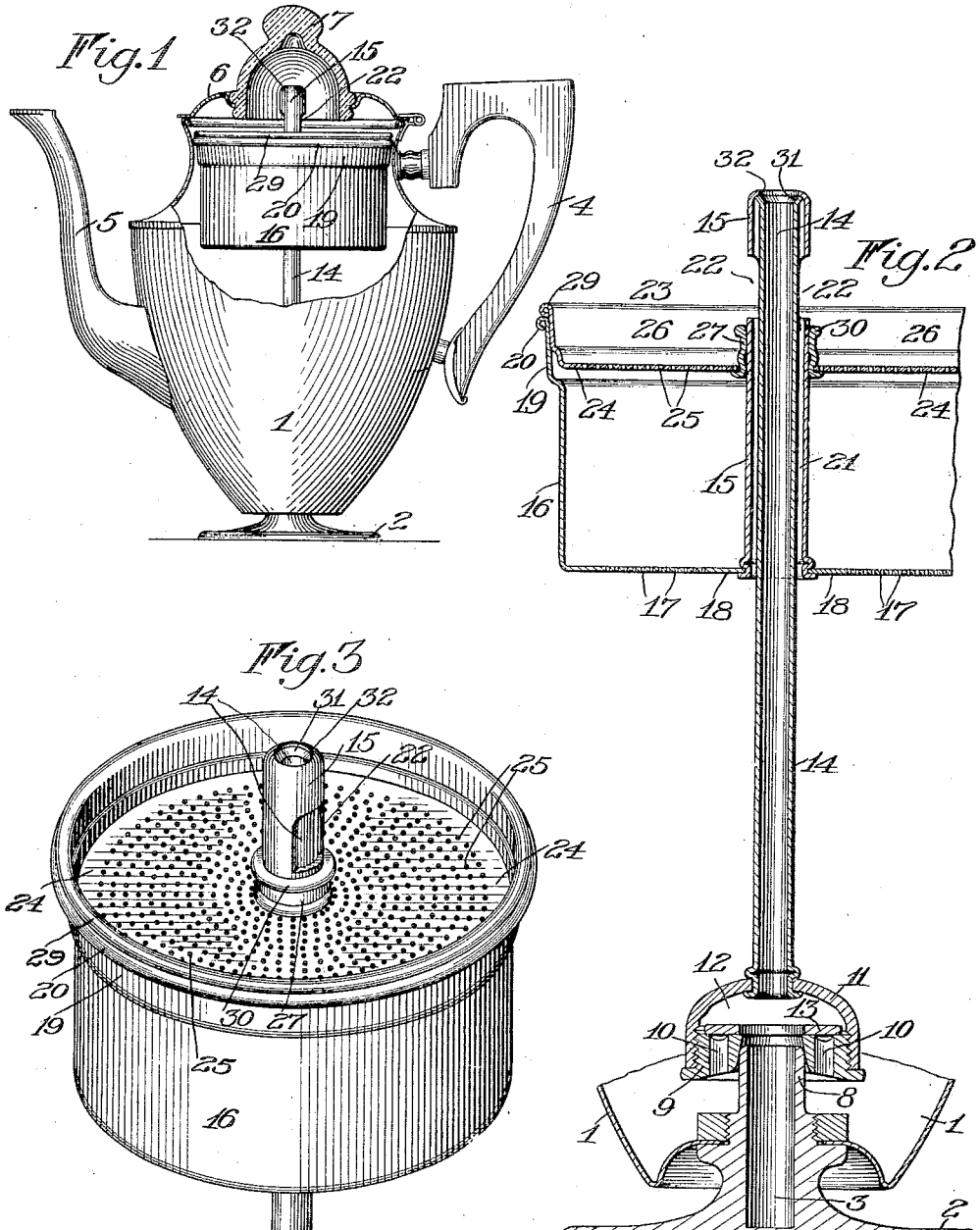

ALFRED H. S. SWAN, OF ROCHESTER, NEW YORK, ASSIGNOR TO ROCHESTER STAMPING COMPANY, OF ROCHESTER, NEW YORK, A CORPORATION OF NEW YORK.

PERCOLATOR.

1,309,374.  Specification of Letters Patent.  Patented July 8, 1919.

Application filed March 14, 1918. Serial No. 222,268.

*To all whom it may concern:*

Be it known that I, ALFRED H. S. SWAN, of Rochester, in the county of Monroe and State of New York, have invented certain new and useful Improvements in Percolators; and I do hereby declare the following to be a full, clear, and exact description of the same, reference being had to the accompanying drawings, forming a part of this specification, and to the reference-numerals marked thereon.

This invention relates to percolators of the type used for making coffee, tea or other infusions, and has for its general object to provide a simple, inexpensive and efficient utensil of this character.

A more special object of the invention is to provide for forming within a perforated retainer a temporary reservoir for heated liquid forced upwardly through a pumping or fountain tube, and to assure an even distribution of this raised liquid over a widespread area into a basket or container, and providing a central overflow for the excess raised liquid into the main vessel.

A further object of the invention is to form the basket, the retainer and the pumping tube in a manner permitting their quick and easy assembling within the main vessel, and facilitating like separation and thorough cleansing of all parts of the percolator after use.

To these and other ends the invention consists in certain improvements and combinations of parts, all as will be hereinafter more fully described, the novel features being pointed out in the claims at the end of the specification.

In the accompanying drawings, which represent a preferred embodiment of the invention, like reference numerals indicate similar parts in the several views.

Figure 1 is a side elevation of the improved percolator, with the main vessel partly broken away;

Fig. 2 is a vertical sectional elevation, drawn to an enlarged scale, of central base portions of the main vessel with the pumping tube adjusted thereto and the partly broken out basket and retainer adjusted on the pumping tube, and Fig. 3 is a top perspective view of the associated basket, the retainer and upper portions of the pumping tube.

The numeral 1 indicates the main infusion vessel or reservoir having a supporting base plate 2 and a small liquid heating chamber 3. To the vessel body is fixed a handle 4, a pouring spout 5, and a hinged cover 6 fitted with the usual glass dome hot liquid deflector 7. Upon a nipple 8 at the bottom of the vessel detachably rests a plate 9 having ports 10, and screwed into the base of a dome 11 providing a hot liquid and steam chamber 12 in which is loosely placed a disk valve 13 closing and opening the ports 10 as the successive charges of liquid in the chamber 3 are heated and discharged upwardly in well known pulsatory manner through a pumping or fountain tube 14 which is fixed to and rises from the dome 11 and projects within the deflector 7. On the open top of the tube 14 is detachably supported by its central tube 15 a ground coffee or tea leaf basket or container 16 having numerous fine perforations 17 in its lower portion or bottom wall 18, and also preferably having an upwardly flared top rim portion 19 marginally beaded at 20.

The tube 15 is fixed at its open lower end to the basket bottom 18, and rises some little distance above its rim bead 20, and is contracted at its open upper end where it is sustained by the flared open upper end of the pumping tube 14 which has smaller diameter than the basket tube 15 to provide a fluid overflow channel 21 between the two tubes. At its upper part the tube 15 has preferably two opposite side openings 22, 22, which have sufficient area to permit simultaneous thumb and finger hold at and through said openings upon both the basket tube and the pumping tube for together lifting and removing from the main vessel 1 the basket 16 and the pumping tube 14 with its attached valved chamber portions 9 to 13.

Above the basket 16 is supported a specially formed perforated retainer generally marked 23, and having one usual function of preventing washing or floating of the grounds or leaves being steeped in the basket 16 over its margin 20, into the more or less completely saturated coffee or tea infusion stored in the main vessel 1. The retainer has a lower portion or bottom wall 24 finely perforated at 25, an upstanding low imperforate side wall 26, and a short central imperforate sleeve 27 fixed to and rising from its bottom 24 and preferably fitted easily upon the basket tube 15 below its upper side openings 22 which are partly below the level of the margin of the retainer side wall 26. The retainer 23 may be sustained wholly from the central basket tube 15 by frictional contact of the sleeve 27 therewith, but it is preferred to form on the side wall 26 a marginal bead 29 which more safely supports the retainer upon the marginal bead 20 of the basket, while the upper portion of the retainer side wall 26 fits closely within the basket rim portion 19. The retainer sleeve 27 is specially provided with a laterally disposed top bead or projection 30, affording a finger-hold for conveniently removing the retainer 23 from the basket 16 when it is desired to increase the coffee charge therein. The bead 30 also facilitates separation of the parts for cleansing purposes, and the reassembling of them in operative relation.

The operation is, in some respects, much the same as usual in that the vessel 1 is charged with the proper volume of water, the basket 16 is supplied with ground coffee or with tea leaves, the retainer 23 is applied to the basket and the vessel cover 6 is closed and the percolator is then placed over any source of heat which induces intermittent pulsatory pumping action, causing more or less of the highly heated water in the vessel 1 to be passed upwardly through the pumping tube 14 and impinge upon the cover deflector 7 and be thereby spread laterally before it falls into the retainer 23. The imperforate side wall 26 and imperforate central sleeve 27 of the retainer form with its perforated bottom 24 a reservoir which temporarily stores the hot liquid which thus is caused to drop evenly through all of the retainer bottom porforations 25 and falls upon a widespread area of the finally ground coffee or tea leaves in the basket 16, and the liquid falls through the basket perforations 17, into the main vessel 1. It is preferable to make the perforated retainer bottom 24 substantially flat or level to assure this same wide-spread dropping of the hot liquid through it when the pulsatory action is somewhat slow, but when said action is rapid or violent and the volume of upwardly pumped hot fluid then exceeds the temporary storage capacity of the retainer, the excess liquid will flow through the basket tube side openings 22 and down through the channel 21 between the tubes 14, 15, into the main vessel 1, and therefore there can be no overflow of the hot liquid from the retainer 23, or from the basket 16, upon the outer surface of the main vessel 1. After use of the percolator its cover 6 may be opened and the valved pumping tube 14, the basket 16 and the retainer 23 may then be manually lifted from the vessel by the thumb and finger applied at the container tube openings 22, and the removed parts may then be easily separated for quickly and thoroughly cleansing them. It may be specially noticed that by forming the pumping tube 14 with an outwardly flared upper extremity 31, fitting within the restricted or inwardly contracted overhanging open upper end 32 of the basket tube 15, the assembled tubes 14, 15 are always held concentrically relatively to each other no matter how carelessly the basket is slipped upon the pumping tube, and therefore the overflow channel 21, between the tubes 14, 15, is kept uniformly open to receive the liquid overflow through the basket tube openings 22, and passing thence down the channel to the main vessel or infusion reservoir.

I claim as my invention:

1. A basket for percolators, comprising a perforated container proper, a supporting and draining tube fixed to the bottom of the basket and having a restricted upper open end projecting above the side wall of the basket and adapted to hang upon the open end of the usual fountain tube, said draining tube being provided with a lateral overflow aperture, a retainer supported above the contents of the basket and having a perforated bottom and provided with an outer rim rising above the bottom of the overflow opening and an inner sleeve fitting the draining tube and terminating beneath said opening.

2. A percolator comprising a main vessel, a pumping tube therein, a container having a perforated lower portion and an upstanding tube formed with opposite side overflow openings and surrounding the smaller pumping tube and providing an overflow channel between the two tubes, and a retainer in the top of the container and having a perforated bottom, an upstanding imperforate wall rising above the lower ends of said overflow openings, and an imperforate upstanding sleeve surrounding the container tube below the overflow openings and provided with a laterally projecting bead or flange affording a finger-hold for removing the retainer from the container.

3. A percolator comprising a main vessel, a pumping tube extending upwardly therein, having an outwardly extending enlargement at its upper end, a container within the vessel and a tube extending upwardly from the bottom of the container having a restricted upper end adapted to rest upon the enlargement and support the container in suspension from said enlarged portion of the pumping tube, the enlargement of the inner tube serving to centralize the container thereon.

ALFRED H. S. SWAN.